United States Patent [19]

Ishikawa et al.

[11] Patent Number: 4,483,303
[45] Date of Patent: Nov. 20, 1984

[54] APPARATUS FOR REGULATING FUEL SUPPLY TO LIQUEFIED PETROLEUM GAS ENGINE

[75] Inventors: Norikazu Ishikawa, Zama; Masanori Fujisaki, Tokyo, both of Japan

[73] Assignee: Nippon Carbureter Co., Ltd., Tokyo, Japan

[21] Appl. No.: 471,249

[22] Filed: Mar. 2, 1983

[51] Int. Cl.³ ............................................. F02B 43/00
[52] U.S. Cl. .................................... 123/527; 123/557; 123/1 A; 48/180 R
[58] Field of Search ............. 123/1 A, 575, DIG. 12, 123/557, 525, 527, 276 E; 48/180.1

[56] References Cited

U.S. PATENT DOCUMENTS 2,602,289  7/1952  Anxionnaz et al. ........ 123/DIG. 12
2,767,691  10/1956  Mengelkamp et al. ............ 123/1 A
3,577,877  5/1971  Warne ................................. 123/575

*Primary Examiner*—E. Rollins Cross
*Attorney, Agent, or Firm*—Charles A. Muserlian

[57] ABSTRACT

An apparatus for regulating fuel supply to a liquefied petroleum gas engine comprising a housing divided by a lower chamber passing through the fuel in liquid phase from a fuel supply to a vaporizer and an upper chamber connected to a carburetor of the engine passing through the fuel in gas phase from the vaporizer to the carburetor by a partition wall having a passage therein, the composition of the fuel being determined in temperature and vapor pressure of the fuel in liquid phase in the lower chamber, the flow of the fuel in gas phase from the passage in the partition wall to the upper chamber being controlled by valve means actuated in response to the temperature and the pressure of the fuel in liquid phase.

10 Claims, 7 Drawing Figures

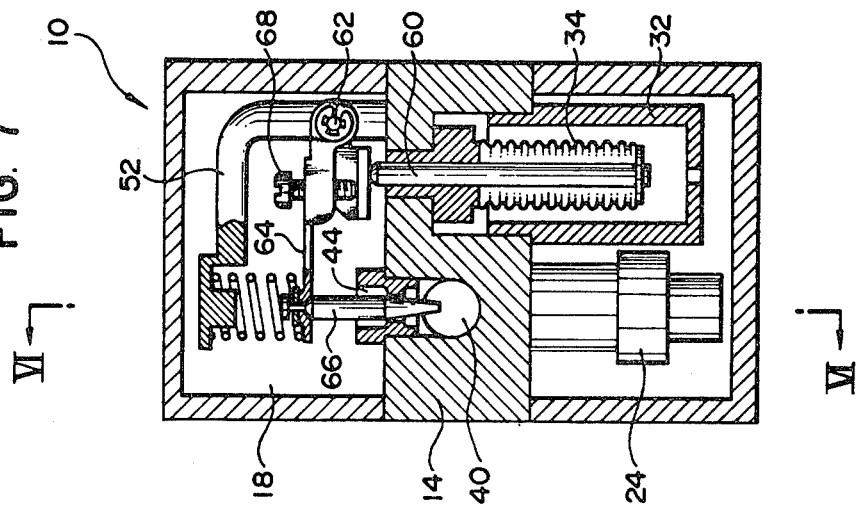
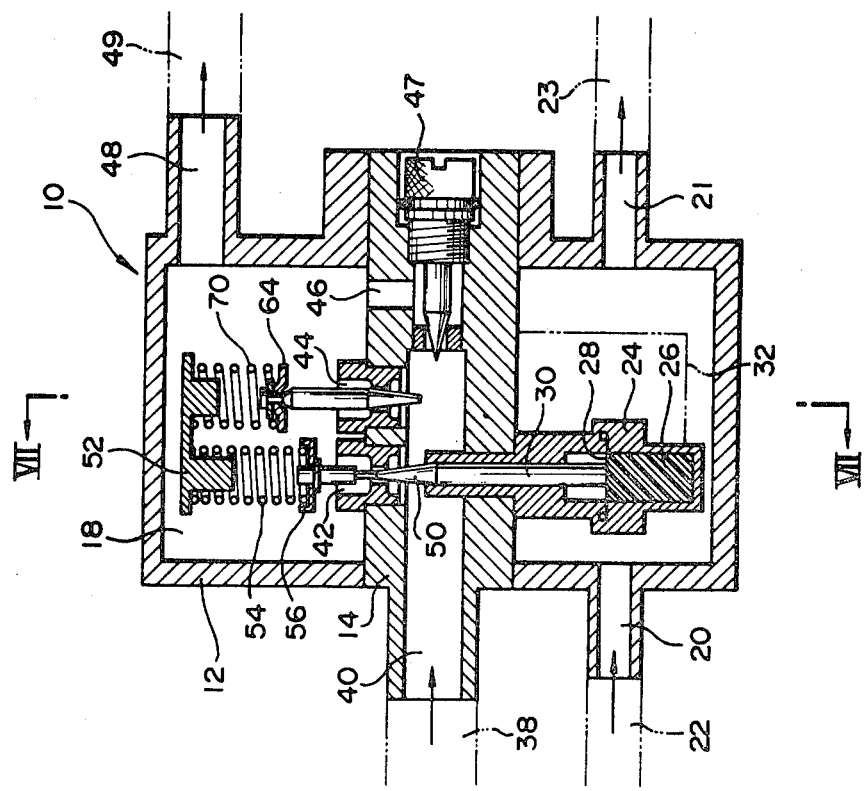

APPARATUS FOR REGULATING FUEL SUPPLY TO LIQUEFIED PETROLEUM GAS ENGINE

BACKGROUND OF THE INVENTION

This invention relates generally to an apparatus for supplying fuel to a liquefied petroleum gas (LPG) engines and more particularly to an automatic regulating apparatus of fuel supply to a carburetor of the engine in accordance with the composition of the LPG with the temperature of air to be mixed with the fuel.

The liquefied petroleum gas which may be prepared by compressing propane, butane or a mixture thereof is generally used as fuel of the internal combustion engine. The relation between an atmospheric temperature and a vapor pressure of the LPG fuel is kept constant in accordance with the composition of the fuel or the proportion of propane and butane.

It is preferable to control a mixture ratio of fuel gas and air to be supplied to the internal combustion engine to a theoretical mixture ratio, that is, an excess air ratio of 1 when the fuel is supplied to the engine. Since, however, the change of the composition ratio of the fuel gas effects to the specific gravity of the fuel, it is necessary to adjust the mixture ratio depending upon the composition of the fuel.

To this end, Japanese Utility Model Application No. 116,533 of 1973 (Provisional Utility Model Publication No. 60424 of 1975) discloses an apparatus for regulating the fuel supply to a LPG engine in which the temperature and the vapor pressure of the LPG to be supplied to the engine are detected and analyzed to confirm the composition of the fuel, and electric signals which correspond to the composition of the fuel confirmed are used for adjusting the fuel flow to the engine. There are, however, disadvantages that the above prior art apparatus requires to provide electrical operation units for detecting and analyzing the composition of the LPG, and the apparatus becomes more complicated in construction which is an extremely expensive in manufacture.

Furthermore, Japanese Patent Application No. 112,407 of 1973 (Provisional Patent Publication No. 63323 of 1975) teaches that an apparatus for controlling fuel supply to a liquefied petroleum gas to an internal combustion engine in which an amount of fuel to be supplied to the engine is adjusted mechanically in making use of the change of a vapour pressure of the fuel depending on the composition of the fuel. In this prior application, however, the ratio of the mixture of the fuel and air only is controlled with respect to the change of the composition of the fuel, but no consideration is taken in the change of the rate of the mixture with respect to the change of temperature being sucked into the engine, that is, the change of the ratio of the mixture of the fuel and air with respect to the change of the specific gravity of air.

In view of the above, it is a principal object of the present invention to provide an apparatus for regulating an amount of a gaseous fuel to be supplied to a liquefied petroleum gas engine in accordance with the composition of the fuel.

It is another object of the present invention to provide an apparatus for regulating fuel supply to LPG engine in sensing and detecting the temperature and pressure of a gaseous fuel being supplied to the engine.

It is still another object of the present invention to provide the above mentioned apparatus which is simple in construction, reliable in use and low in cost.

BRIEF DESCRIPTION OF THE DRAWINGS

FIG. 6 is a cross-sectional view of one embodiment of the apparatus according to the present invention, the view being taken on line VI—VI of FIG. 5; and FIG. 7 is a sectional view taken along lines VII—VII of FIG. 6.

DETAILED DESCRIPTION

In general, a fuel supply system of LPG engine is consisting of a vessel B in which liquefied LPG fuel is bottled, a filter F, a solenoid valve E, a vaporizer V and a carburetor C.

In such a system, when the temperature of the liquefied fuel from the vessel to the vaporizer is represented by T, the temperature Ta of air being taken into the engine is shown as follows:

$$Ta = T = D \text{ (D is constant)}$$

and the temperature Tf of the fuel in gas phase from the outlet of the vapourizer may be determined experimentally as follows:

$$Tf = T + E \text{ (E is constant)}$$

Figure 1:
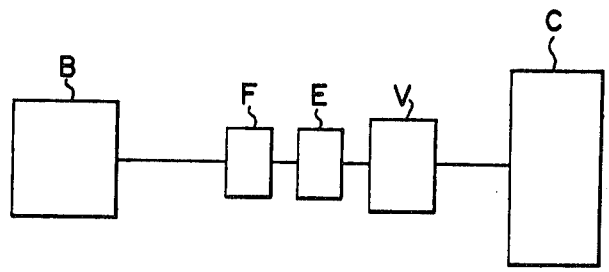
FIG. 1 is a schematic diagram showing a system for supplying LPG fuel to an internal combustion engine.
Figure 2:
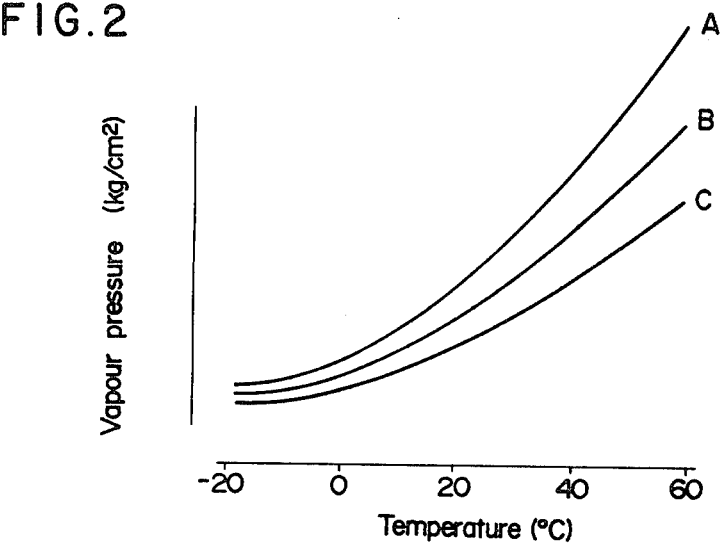
FIG. 2 is a graph showing a relation between temperature and vapour pressure of the composition of LPG in liquid phase.

In FIG. 2, curve A represents a fuel consisting of 100% propane and 0% butane, curve B represents a fuel consisting of 50% propane and 50% butane and curve C represents a fuel consisting 100% butane and 0% propane. As shown in FIG. 2, the relation between the gaseous temperature and the vapour pressure with respect to the composition of LPG fuel to be used for internal combustion engines is maintained in constant.

Figure 3:
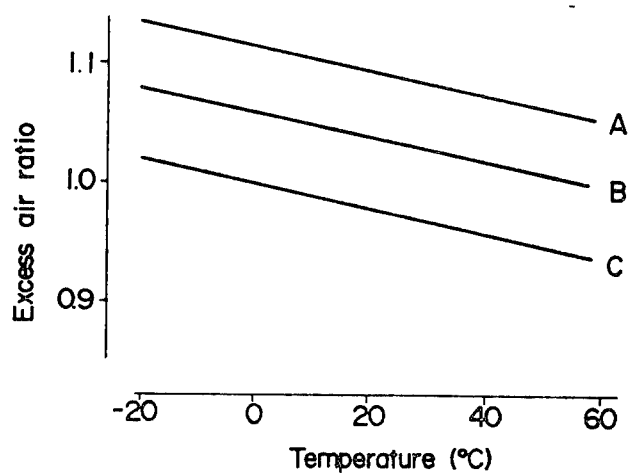
FIG. 3 is a graph showing a relation between temperature and excess air ratio of LPG in liquid phase.

FIG. 3 is a graph showing the relation between the temperature and the excess air ratio of each of the above compositions A, B and C of the fuel, from which it will be understood that the fuel flow to be supplied to the engine must be reduced in order to attain the excess air ratio=1 when the temperature of the fuel is raised.

Figure 4:
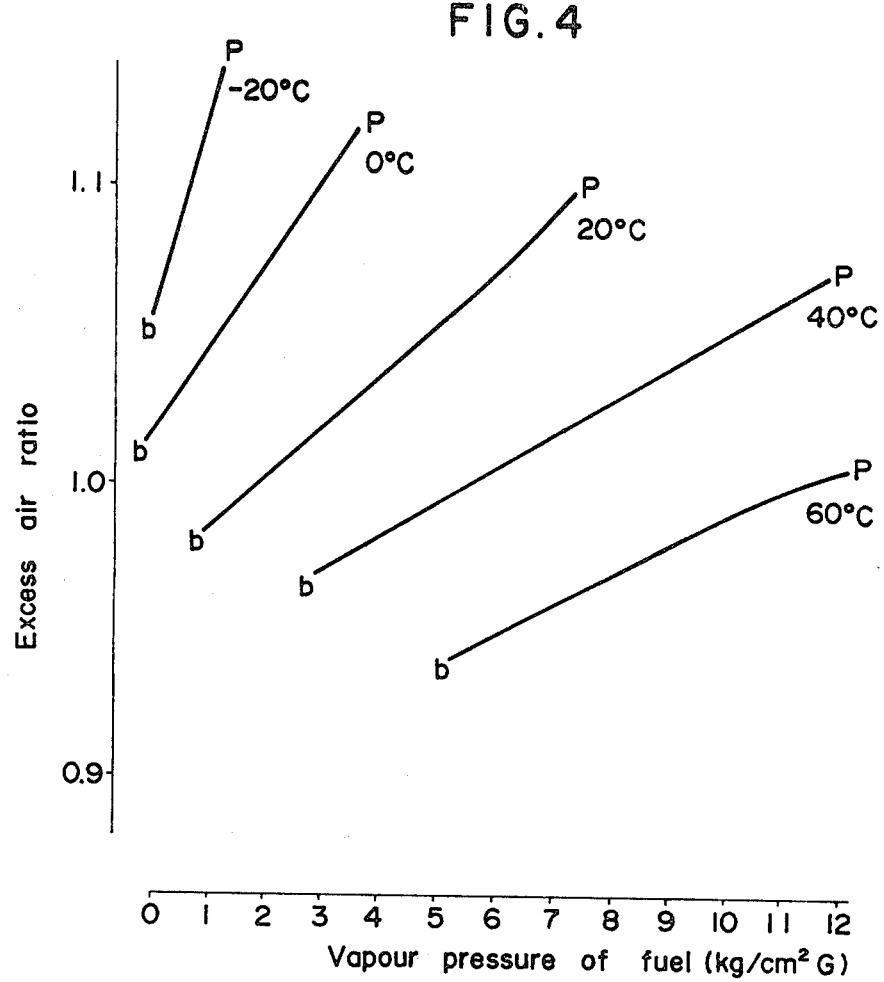
FIG. 4 is a graph showing a relation between vapour pressure and air excess ratio of LPG in liquid phase.

Referring to FIG. 4, there is shown a graph which represents the relation between the excess air ratio and the vapor pressure of the composition of the LPG fuel, in which the letter "p" at an upper end of each curve represents the fuel consisting of 100% propane and 0% butane, and the letter "b" at a lower end lower represents the fuel consisting of 0% propane and 100% butane. According to the graph of FIG. 4, it will be understood 4 that when the pressure of the LPG fuel in gas phase is raised, the excess air ratio is increased and that the relation between the two depends on the temperature in the LPG fuel.

Figure 5:
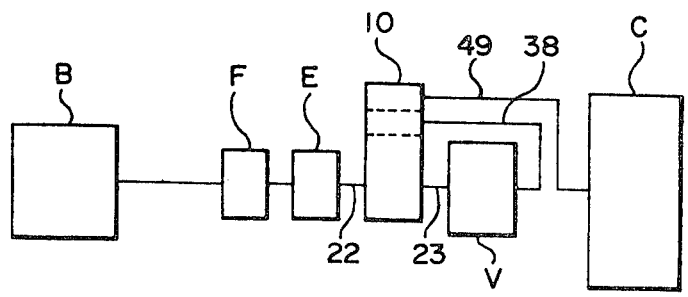
FIG. 5 is a schematic diagram showing a system of supplying LPG fuel having an apparatus for regulating fuel supply to LPG engine according to the present invention.

Accordingly, the present invention is to provide an apparatus for regulating fuel supply to the LPG engine and which apparatus may be arranged in a system as shown in FIG. 5. According to the present invention the LPG fuel from a vessel B in liquid phase to a vaporizer V may be measured in temperature and pressure by means of the apparatus 10 and then the LPG fuel flow from the vaporizer V to a carburetor C in gas phase may be adjusted according to the measurements of the temperature and pressure of the LPG fuel in liquid phase through the apparatus 10.

The apparatus 10 according to the present invention comprises a casing or housing 12 which is divided into a lower chamber 16 and an upper chamber 18 by means of a partition wall 14. The lower chamber 16 is provided with an inlet 20 and an outlet 21 for the LPG fuel in liquid phase. The inlet 20 is connected by a conduit 22 to a solenoid valve E and the outlet 21 is connected by another conduit 23 to a vaporizer V in which the LPG fuel in liquid phase may be converted into the LPG fuel in gas phase.

A temperature sensor 24 is provided in the lower chamber 16 and fixed to the partition wall 14. The temperature sensor 24 consists of a casing containing wax 26 which can be expanded or contracted in response to temperature of the LPG fuel in liquid phase and a diaphragm 28 adapted to be moved by the action of the wax 26. In order to sense completely the temperature of the LPG fuel passing through the lower chamber 16, a portion of the casing containing wax 26 of the temperature sensor 24 is arranged to be immersed in the fuel in the lower chamber 16. The sensor 24 may be constructed to actuate a first valve means 30 to reduce the fuel flow in gas phase from the vaporizer V to a carburetor C of the engine through the upper chamber 18 in inverse proportion to an increase in the temperature in the LPG fuel in liquid phase passing through the corner chamber 16.

Further in the lower chamber 16, a sensor means 32 is provided for measuring the pressure of the LPG fuel in liquid phase passing through the chamber 16. The pressure sensor 32 includes bellows 34 which are capable of responding to an evaporating pressure of the LPG fuel in liquid phase passing through the lower chamber 16 and actuating a second valve means 36 to increase the supply of the LPG fuel in gas phase from the vaporizer to the carburetor of the engine through the upper chamber 18 in proportion to the increase in the pressure of the LPG fuel in liquid phase passing through the lower chamber 16.

As it is understood from the above, the LPG fuel in the vessel B is fed through the conduit 22 from the solenoid valve E to the lower chamber 16 of the apparatus 10 and the temperature of the LPG fuel in liquid phase is sensed by the temperature sensor 24 and the pressure of the LPG fuel in liquid phase is sensed by means of the pressure sensor 32 and then the fuel is fed to the vaporizer V in which the LPG fuel in liquid phase is gasified and regulated in pressure. Thus the LPG fuel in gas phase is fed to the upper chamber 18 through a passage 40 formed in the partition wall 14.

The passage 40 is provided with three openings 42, 44 and 46 for communicating with the upper chamber 18. The first opening 42 may be cooperated with the first valve means 30 and the second openings 42 may be cooperated with the second valve means 36, the third opening 46 is provided with a needle valve means 47 which may be actuated manually from the outside of the apparatus 10 so as to adjust the fuel flow to the engine in accordance with the capacity thereof.

An outlet 48 is provided at the upper portion of the upper chamber 18, which is connected to the carburator C of the LPG engine through a conduit 49.

The first valve means 30 has a valve member 50 which may be operated in response to the action of the diaphragm 28 in accordance with the expansion or contraction of the wax 26 in the casing of the temperature sensor 24 so as to control the first opening 42 in the passage 40 provided to the partition wall 14. In order to actuate the valve member 50 precisely, a suitable means such as, for example, an adjusting means 56 including a spring 54 may be arranged between a support member 56 which is provided in the upper chamber 18 and the valve member 50.

The second valve means 36 is constructed to actuate a valve member 66 by means of mechanisms including a rod member 60 which may be operated by the action of the bellows 34 and an arm member 64 pivoted by a pin 62 to a support member 52 provided in the upper chamber 18. A valve member 66 which is attached to the free end of the arm member 64 may be operated in response to the pressure of the LPG fuel in liquid phase to decrease the LPG fuel in vapor phase passing through the opening 44 in the passage 40 when the pressure in the fuel is increased. In order to actuate the valve member 66 precisely in response to the operation of the bellows 34, it is preferable to provide an adjusting means 68 for setting the position of the arm member 64 and a spring 70.

Means for mounting the first valve means 30, the second valve means 36 and the adjusting means 68 mentioned above may be designed suitably by those skilled in the art.

The needle valve means 47 for adjusting the fuel flow passing through the third opening 46 in the passage 40 may be adjusted or regulated depending upon the capacity of the LPG engine to be used.

OPERATION

As it is understood from the above, according to the present invention, the LPG fuel in liquid phase from the vessel B passing through the filter F and the solenoid valve E to the lower chamber 16 of the apparatus 10 will be measured in temperature and pressure. If the temperature of the LPG fuel in liquid phase passing through the lower chamber 16 is raised, the valve member 50 of the first valve means 30 is operated to reduce the flow of the LPG fuel in the gas phase passing through the opening 42 in the passage 40 to the upper chamber 18, and if the pressure of the LPG fuel in liquid phase passing through the lower chamber 16 is increased, the valve member 66 of the second valve means 36 is actuated to increase the flow of the LPG fuel in gas phase passing through the opening 44 in the passage 40 accordingly. Then the LPG fuel which is converted into the fuel in gas phase in the vaporizer V will be flown from the passage 40 in the partition wall 14 through the first opening 42, the second opening 44 and the third opening 46 to the upper chamber 18. The total amount of the fuel flow to the upper chamber 18 to the carburetor C of the LPG engine may be regulated in temperature and pressure of the LPG fuel in liquid phase, this is, the composition of the LPG gas fuel. It is, therefore, capable of adjusting the fuel flow into the carburetor C of the engine so as to attain a desired excess air ratio of 1.

While the invention has been described in the preferred form of the present invention, it is to be understood that modifications may be made without departing from the scope and spirit of the in its broader aspects.

What is claimed is:

1. In an apparatus for regulating the fuel supply to a liquefied petroleum gas engine, which apparatus is to be disposed in a fuel supply system including a supply of the liquefied petroleum gas fuel in liquid phase, a vaporizer for converting the fuel in liquid phase into the fuel in gas phase and regulating its pressure, and a carburetor for mixing the fuel in gas phase with air and supplying the mixture to the engine, the improvement comprising:
   (A) a first valve means for regulating the flow of the fuel supplied from said vaporizer to said carburetor in response to the temperature of the fuel in liquid phase being fed from said fuel supply to said vaporizer; and
   (B) a second valve means for regulating the flow of the fuel supplied from said vaporizer to said carburetor in response to the vapor pressure of the fuel in liquid phase being fed from said fuel supply to said vaporizer.

2. An apparatus for regulating the fuel supply to a liquefied petroleum gas engine as claimed in claim 1 wherein said first valve means is arranged so as to regulate the flow of the fuel in gas phase in inverse proportion to the temperature of the fuel in liquid phase.

3. An apparatus as claimed in claim 1 wherein said second valve means is arranged so as to regulate the flow of the fuel in gas phase in proportion to the vapor pressure of the fuel in liquid phase.

4. An apparatus as claimed in claim 1 wherein said first valve means is actuated by means of the expansion or contraction of wax in a temperature sensing means.

5. An apparatus as claimed in claim 1 wherein said second valve means is actuated by means of bellows which sense the vapor pressure of the fuel in liquid phase.

6. An apparatus as claimed in claim 1 which further includes a third valve means for regulating the flow of the fuel in gas phase from said vaporizer to said carburetor.

7. An apparatus for regulating fuel supply to a liquefied petroleum gas engine comprising
   a housing;
   a partition wall dividing said housing into a lower chamber for providing a passage of the fuel in liquid phase from a fuel supply to a vaporizer and an upper chamber for providing a passage of the fuel in gas phase from said vaporizer to a carburetor;
   a passage of the fuel in gas phase provided in said partition wall;
   a first opening and a second opening provided in said passage in said partition wall;
   a means for sensing the temperature of the fuel in liquid phase passing through said lower chamber;
   a means for sensing the vapor pressure of the fuel in liquid phase passing through said lower chamber;
   a first valve means provided in said passage in said partition wall for regulating the fuel flow of said first opening in cooperation with said temperature sensing means;
   a second valve means provided in said passage in said partition wall for regulating the fuel flow of said second opening in cooperation with said pressure sensing means.

8. An apparatus as claimed in claim 7 wherein a third opening is provided in said passage in said partition wall and third valve means is provided in said third opening.

9. An apparatus as claimed in claim 7 wherein said first valve means is actuated by means of the thermal expansion and contraction of wax contained in said temperature sensing means.

10. An apparatus as claimed in claim 7 wherein said second valve means is actuated by means of bellows arranged in said pressure sensing means.

* * * * *